US006981795B2

(12) United States Patent
Nikkah

(10) Patent No.: US 6,981,795 B2
(45) Date of Patent: Jan. 3, 2006

(54) MULTIPLE BLADE BLENDER APPARATUS

(75) Inventor: Ali Nikkah, Mission Viejo, CA (US)

(73) Assignee: Sylmark Holdings Limited, (IE)

( * ) Notice: Subject to any disclaimer, the term of this patent is extended or adjusted under 35 U.S.C. 154(b) by 0 days.

(21) Appl. No.: 10/823,163

(22) Filed: Apr. 12, 2004

(65) Prior Publication Data

US 2005/0018534 A1    Jan. 27, 2005

Related U.S. Application Data

(60) Provisional application No. 60/490,227, filed on Jul. 25, 2003, provisional application No. 60/490,152, filed on Jul. 25, 2003.

(51) Int. Cl.
*B01F 7/00*    (2006.01)
(52) U.S. Cl. .................. 366/199; 366/205; 366/292; 366/314; 241/46.17
(58) Field of Classification Search ............... 366/297, 366/298, 299, 300, 301, 314, 205, 197, 292, 366/199; 241/46.017, 46.17
See application file for complete search history.

(56) References Cited

U.S. PATENT DOCUMENTS

| | | | |
|---|---|---|---|
| 950,056 A | 2/1910 | Rice | |
| 2,321,092 A * | 6/1943 | Lomax | .................. 366/349 |
| 2,794,626 A | 6/1957 | Sterritt | |
| 2,990,978 A | 7/1961 | Charos | |
| 3,285,582 A * | 11/1966 | Hubner | .................. 366/300 |
| 3,332,368 A | 7/1967 | Stickelber | |
| 3,334,873 A | 8/1967 | Stickelber | |
| 3,342,425 A * | 9/1967 | Morton | .................. 366/302 |
| 3,345,043 A * | 10/1967 | Bovagne | .................. 366/314 |
| 3,722,831 A | 3/1973 | Bialas et al. | |
| 4,256,407 A | 3/1981 | Seiderman | |
| 4,493,557 A | 1/1985 | Nayak et al. | |
| 4,758,095 A | 7/1988 | Kanda et al. | |
| 4,775,239 A | 10/1988 | Martinek et al. | |
| 4,911,557 A | 3/1990 | Dormer et al. | |
| 5,083,506 A | 1/1992 | Horn et al. | |
| 5,094,541 A | 3/1992 | Nelson | |
| 5,118,199 A | 6/1992 | Howk | |
| 5,299,865 A | 4/1994 | Presnell | |
| 5,460,448 A | 10/1995 | Woolsey | |
| 5,463,937 A | 11/1995 | Belongia et al. | |
| 5,697,704 A | 12/1997 | Coyle | |
| 5,758,962 A | 6/1998 | Ismar | |
| 6,270,248 B1 | 8/2001 | Yoshida et al. | |
| 6,527,433 B2 * | 3/2003 | Daniels, Jr. | .................. 366/205 |
| 2002/0196703 A1 | 12/2002 | Rumph | |

* cited by examiner

*Primary Examiner*—Tony G. Soohoo
(74) *Attorney, Agent, or Firm*—Kathy Mojibi Kavcioglu

(57) ABSTRACT

A multi-blade blender is disclosed having a drive shaft, a gear system, and at least two blade assemblies. Each blade assembly includes a blade affixed to an end of a blade shaft. The blade shafts of the first, second and third blade assemblies are angled from the vertical position toward the container wall. The gear system engages at least one of the blade assemblies. The drive shaft engages the gear system and causes the blade assemblies to rotate in operation.

13 Claims, 6 Drawing Sheets

MULTIPLE BLADE BLENDER APPARATUS

RELATED APPLICATIONS

The present application claims priority from U.S. Provisional Application No. 60/490,227, entitled "Double Blade Blender Apparatus," filed on Jul. 25, 2003 and U.S. Provisional Application No. 60/490,152, entitled "Multiple Blade Blender Apparatus," filed on Jul. 25, 2003.

FIELD OF INVENTION

The present invention relates generally to blenders, and more particularly to a blender apparatus utilizing two or more blade assemblies.

BACKGROUND OF THE INVENTION

Electric blenders have been in existence for many years. Electric blenders are used to chop, mix, and blend varying foods or other materials such as liquids. Blenders include an electric motor that drives a blade shaft which in turn causes rotational movement of a blade on the end of the blade shaft. This single blade shaft configuration chops and blends food and other materials by processing only those materials that fall to the center of the blender base. The single blade shaft configuration does not promote sufficient movement in the foods or other materials in the blender and often results in lengthy blending times and inadequate blending.

Thus, there is a need in the art for an improved blender that allows for quicker and more precise chopping and blending of foods and other materials.

SUMMARY OF PREFERRED EMBODIMENTS

A multi-blade blender is disclosed having a drive shaft, a gear system, and at least two blade assemblies. Each blade assembly includes a blade affixed to an end of a blade shaft. The blade shafts of the first, second and third blade assemblies are angled from the vertical position toward the container wall. The gear system engages at least one of the blade assemblies. The drive shaft engages the gear system and causes the blade assemblies to rotate in operation.

DETAILED DESCRIPTION OF PREFERRED EMBODIMENTS

Figure 1:
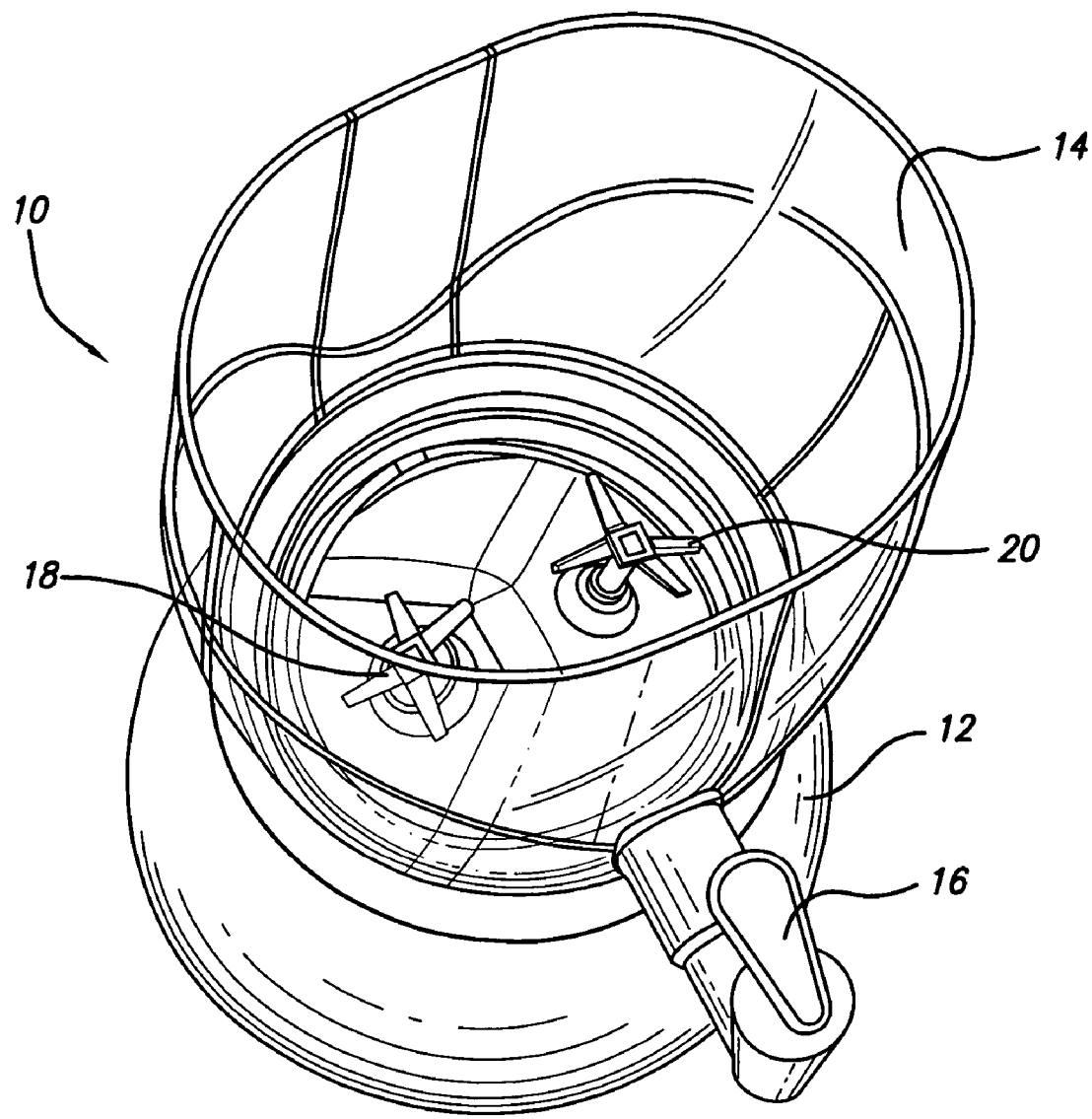
FIG. 1 is a perspective view of a double blade blender, according to one embodiment of the present invention.
Figure 2:
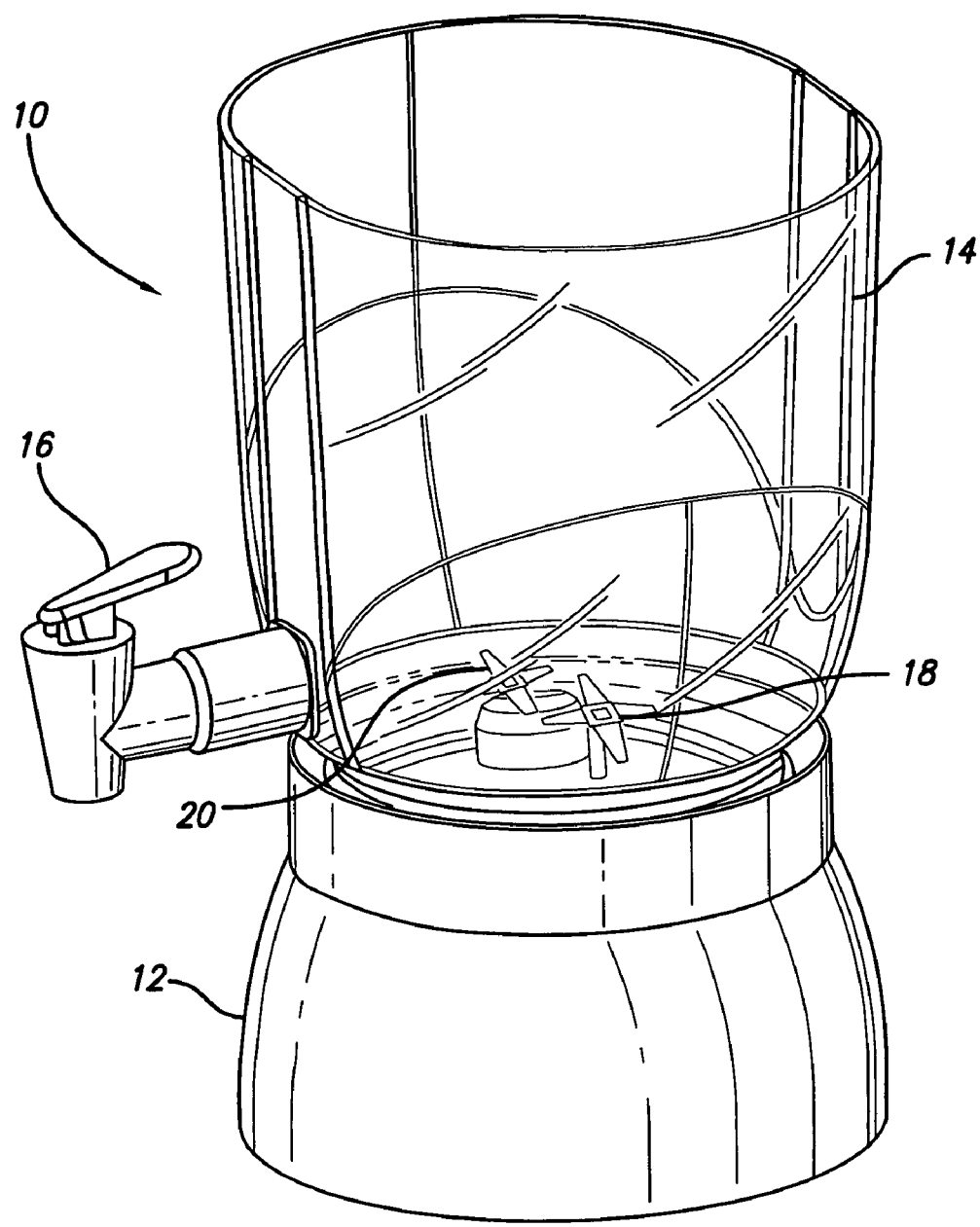
FIG. 2 is another perspective view of the double blade blender of FIG. 1.

As shown in FIGS. 1–2, in a preferred embodiment of the invention, blender 10 includes a base 12 and a container 14. The container 14 is removably affixed to the blender base 12 such that it can be secured to the base during operation but removed therefrom for the purposes of cleaning or other uses. The container can be made of any material, and in a preferred embodiment of the invention is made of a clear plastic or glass to allow the user to view the blender base 12 in operation. A spout 16 is in fluid communication with the container 14 to facilitate the extraction of a liquid from the blender 10 without lifting the container 14 from the base 12.

Figure 3:
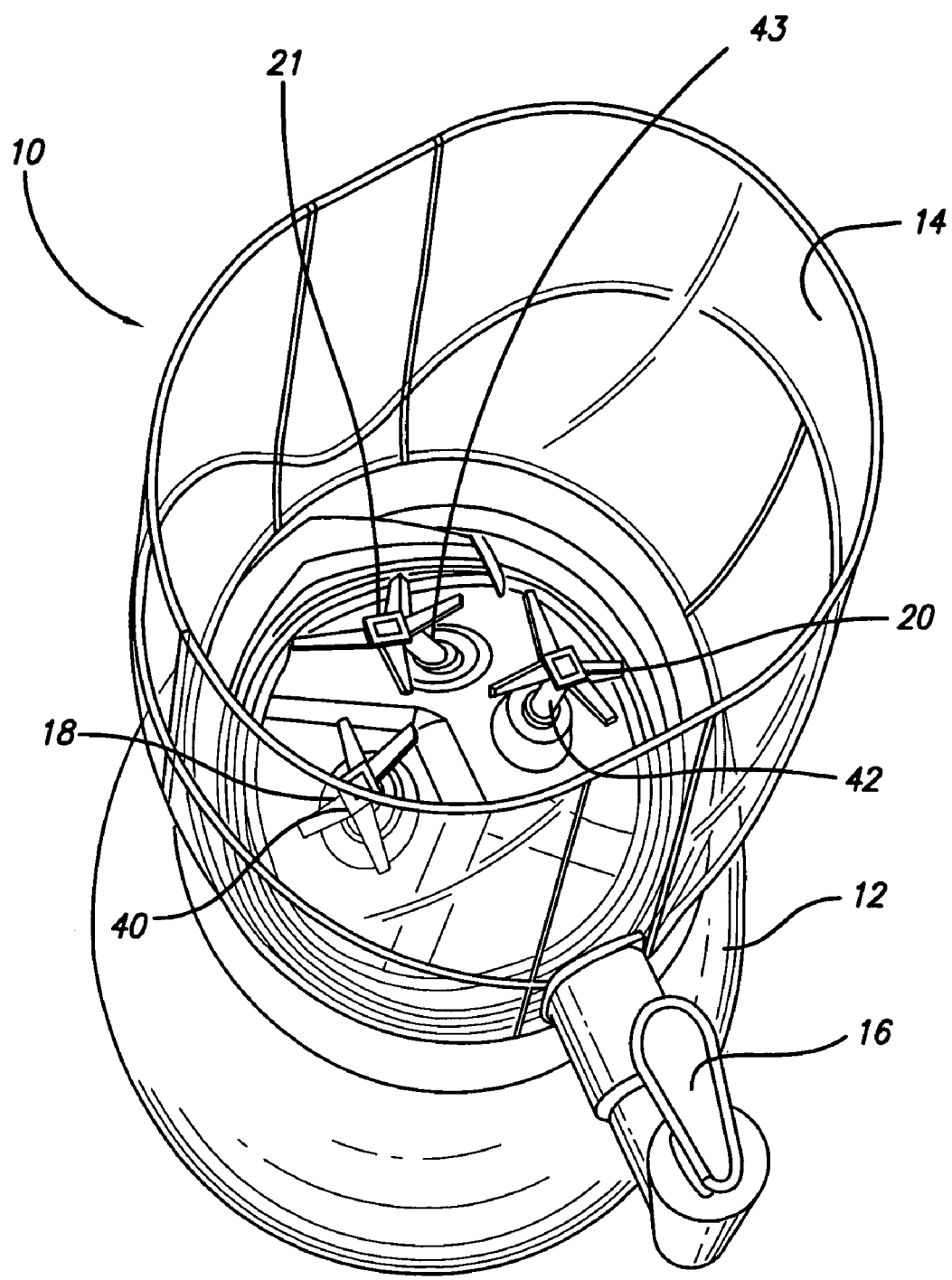
FIG. 3 is a perspective view of a multiple blade blender, according to another embodiment of the present invention.

In the embodiment shown in FIGS. 1 and 2, blender 10 includes two mixing blades 18, 20. It is envisioned that the present invention encompasses a blender having any number of blades and, as such, the invention should not be viewed as limited to the embodiments shown in these figures. For example, FIG. 3 depicts another embodiment of the invention wherein three mixing blades 18, 20, 21 are provided. Additional blades can be added using the principles disclosed herein without departing from the present invention.

Figure 4:
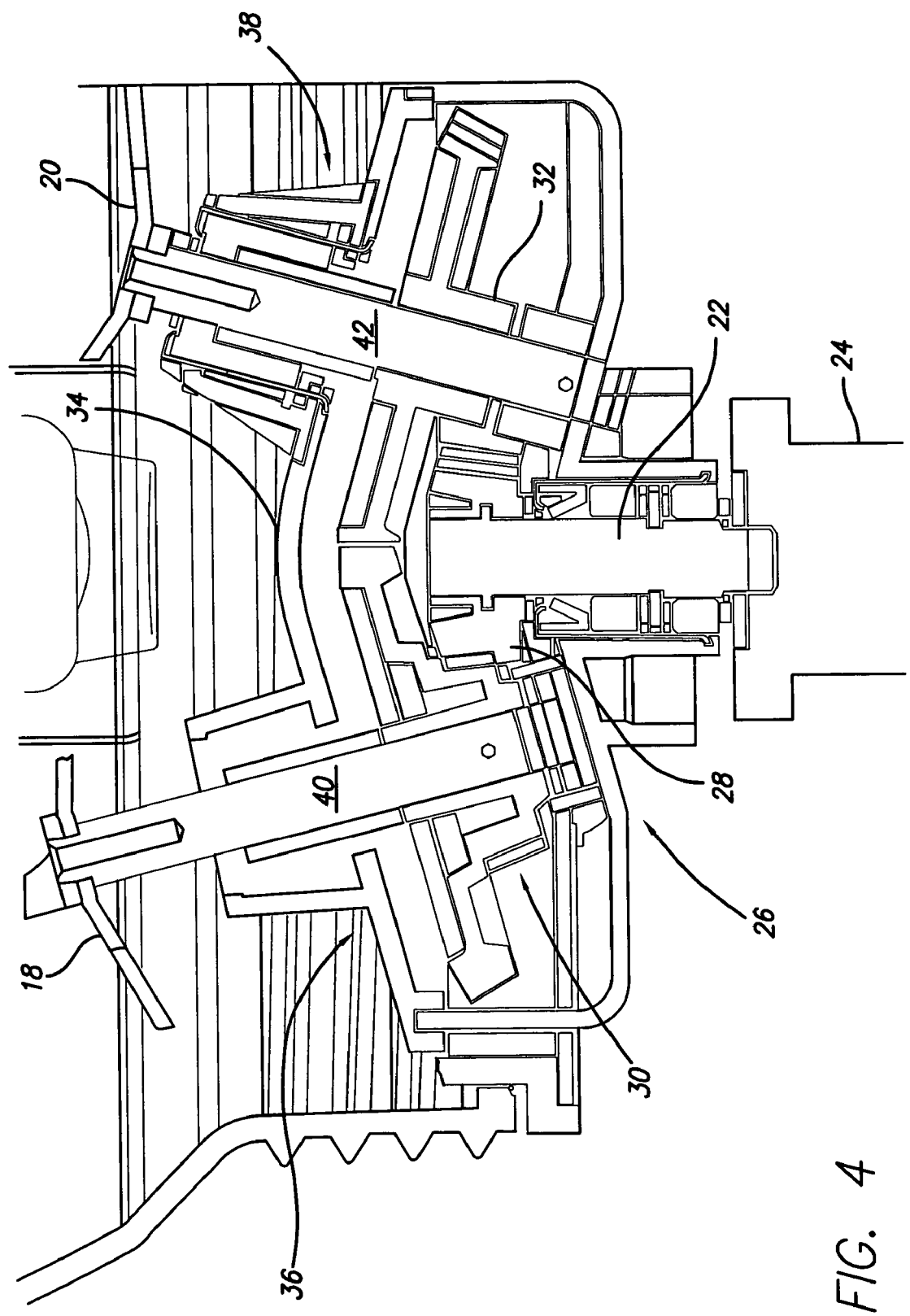
FIG. 4 is a cross-sectional view of the base of a multiple blade blender, according to one embodiment of the present invention.

In an exemplary embodiment of the invention, as shown in FIG. 4, the blender base 12 causes the rotational movement of two blender blades 18, 20. The blender base consists of a drive shaft 22 that is driven by an electric motor 24. The drive shaft 22 interfaces a gear system 26. According to one aspect of the invention, the gear system 26 may include a drive gear 28 and two intermediate gears 30, 32. The first and second intermediate gears 30, 32 are laterally positioned in the base 12 from the drive gear 28 so that each may be simultaneously driven by the drive gear 28. If additional blades are desired, additional intermediate gears can be provided. For example, a third intermediate gear (not shown) can be laterally positioned from the drive gear 28 and be simultaneously driven by the drive gear 28. Although the third intermediate gear is not shown in the figures, it operates in a similar manner to either or both of the first and second intermediate gears 30, 32.

In another preferred embodiment, the gear system 26 can be configured so that the drive gear 28 engages the first intermediate gear 30 but not the second intermediate gear 32. The first intermediate gear 30 may engage the second intermediate gear 32 to cause rotational movement of the second intermediate gear 32. This gear configuration will cause the second intermediate gear 32 to rotate in a direction opposite the first intermediate gear 30.

Similarly, if there is a third intermediate gear, the gear system 26 can be configures so that the drive gear 28 does not engage the third intermediate gear. Rather, the drive gear 28, engages the first intermediate gear 30, and the first intermediate gear, in turn, engages the second and third intermediate gears, causing the second intermediate gear 32 and third intermediate gear (not shown), respectively. This gear configuration will cause the second intermediate gear 32 and the third intermediate gear (not shown) to rotate in a direction opposite the first intermediate gear 30. The electric motor 24, drive shaft 22, and gear system 26 are preferably disposed in the base housing 34 of the blender base 12.

In reference to FIG. 4, the blender base 12 further includes a first blade assembly-36 and a second blade assembly 38. The first blade assembly 26 may include a first blade 18 positioned on an end of a first blade shaft 40. The second blade assembly 38 may include a second blade 20 positioned on an end of a second blade shaft 42. Configurations of blades for blenders are will known to those skilled in the art and will not be described in detail here. The blades may be of any shape, size and material makeup adequate for use in a blender. The first blade shaft 40 may be positioned to interface the first intermediate gear 30 and the second blade shaft 42 may be positioned to interface the second intermediate gear 32. Those skilled in the art will appreciate that the first and second blade assemblies may be affixed to the intermediate gears to cause rotation or may be threaded, such as in a helical design, to promote rotation.

Figure 6:
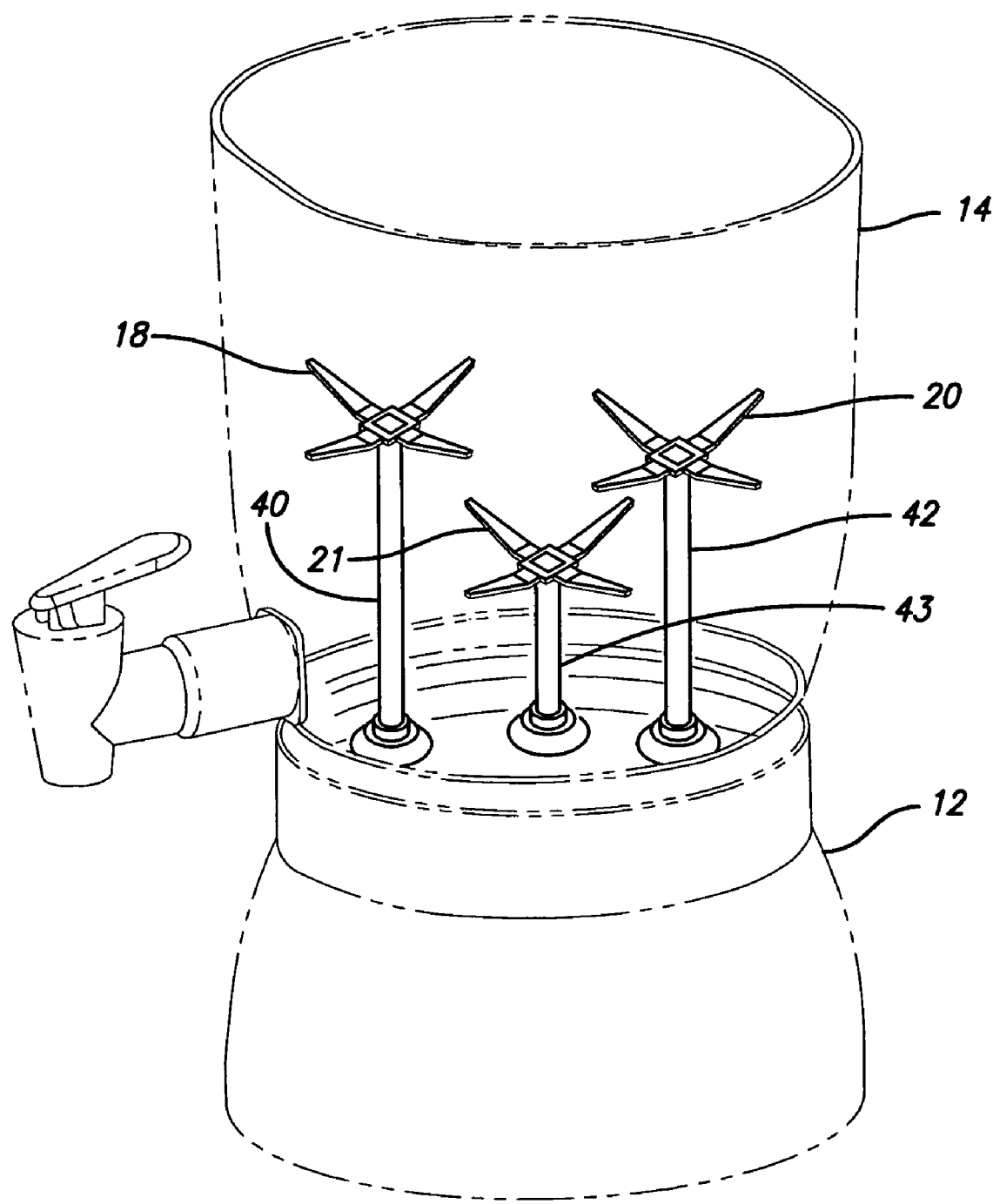
FIG. 6 is a perspective view of a multiple blade blender having different blade heights, according to one embodiment of the present invention.

In an embodiment having a third intermediate gear, a third blade assembly can be provided in the blender base. As shown in FIG. 6, the third blade assembly includes a third blade 21 positioned on an end of a third blade shaft 43. The third blade shaft 43 is positioned to interface the third intermediate gear (not shown).

In one embodiment, the drive shaft 22 of the electric motor 24 rotationally moves the drive gear 28. The drive gear 28 engages the first and second intermediate gears 30, 32 which in turn rotate the first and second blade shafts 40, 42 respectively. The rotation of the first and second blade shafts 40, 42 produce rotational movement of the first and second blade 18, 20 so that food and other material placed in the container 14 can be cut and blended.

In an embodiment having a third intermediate gear, the drive gear engages the first, second and third intermediate gears which in turn, rotate the first, second and third blade shafts 40, 42, 43. The rotation of the first, second and third blade shafts 40, 42, 43 produce rotational movement of the first, second and third blades 18, 20, 21 so that food and other material placed in the container 14 can be cut and blended.

It will be appreciated that the gear system 26 is not limited to the configuration having the drive gear 28 and a two intermediate gears 30, 32, but also may include any gear configuration that allows the blades 18, 20 to be rotated from the electric motor 24. For instance, the gear system 26 may include only a drive shaft that has teeth that directly engages one or more intermediate gears or the blade assemblies. It is also contemplated that the gear system 26 may include components of a transmission such as speed reduction gears (not shown) so that the speed of the blade shafts may be jointly or individually controlled.

To enable the cutting and/or blending of the food or material in the container, the first blade shaft 40, second blade shaft 42, and third blade shaft 43 may protrude substantially vertical from the base housing 34 such that the blade shafts 40, 42, 43 are substantially perpendicular to a flat surface on which the blender 10 may rest. The blade shafts 40, 42, 43 also may protrude at a substantial angle from the base housing 34.

In one embodiment of the invention, as shown in FIG. 2, the first blade shaft 40 and the second blade shaft 42 protrude from the base housing at approximately 30 degree angles from vertical. The angle allows the first and second blades 18, 20 to be tilted toward the container walls to induce movement of the food or other material inserted therein. The angled blade shafts promote improved cutting and blending by forcing the food against the container 12 walls. Any angle that promotes cutting and/or blending of the food or material in the container is contemplated including blade shafts angled away from the container walls, though it will be appreciated that the blade shafts may be positioned vertically. In addition to angling the blade shafts, the blades 18, 20 may be angled toward or from the container walls to achieve an effect similar to the embodiment described above.

The first and second blade shafts 40, 42 and blades 18, 20 may be laterally positioned on the base 12 such that the first and second blade assemblies 30, 32 do not interfere with the other's movements. For instance, in one embodiment, the first blade shaft 40 is positioned approximately 3 inches from the second blade shaft 42. In this embodiment, the first blade 18 and the second blade 20 may have diameters such as one inch, which prevent blades 18, 20 from contacting each other. Further, the first and second blade shafts 40, 42 are preferably laterally positioned as to not interfere with the first and second blades' 18, 20 movements.

In a three blade configuration, the third blade 21 can be similarly positioned at any location as long as it does not interfere with the movement of the other two blades 18, 20. For instance, in one embodiment, the three blade shafts 40, 42, 43 are positioned in a triangular configuration about the center of the base 12 at such a distance as to not interfere with the movement of the adjacent blades.

The first, second and third blades 18, 20, 21 also may be positioned at any height above the base housing 34 of the blender 10. In one embodiment, the first, second and third blades 18, 20, 21 may all be positioned an equal height above the base housing 34. For example, the first, second and third blades 18, 20, 21 may be positioned approximately ½ inch above the base housing 34, however, any distance above the base housing 34 is contemplated.

Figure 5:
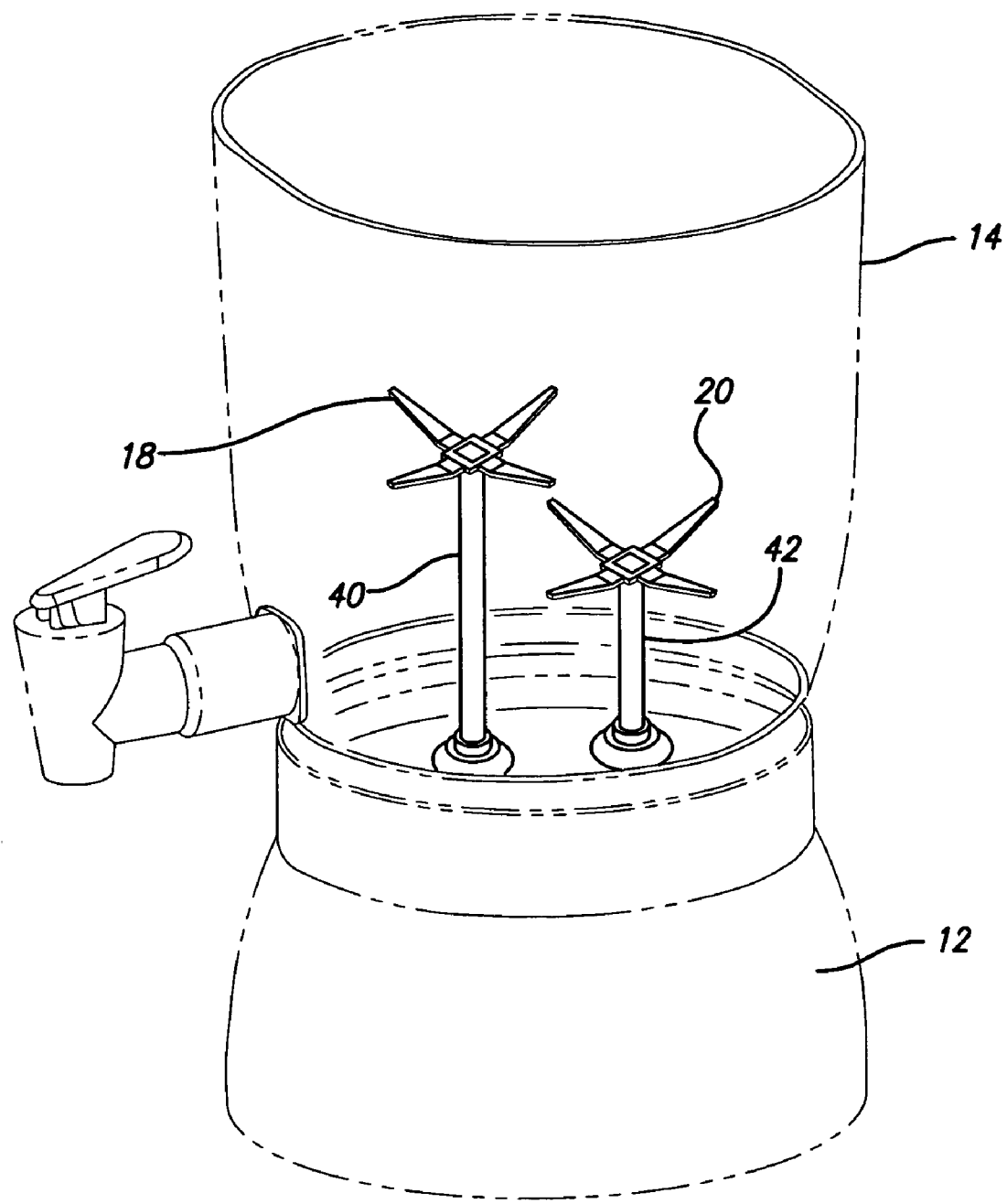
FIG. 5 is a perspective view of a double blade blender having different blade heights, according to one embodiment of the present invention.

In another embodiment, the first, second and third blades 18, 20, 21 may be positioned at different heights above the base housing 34. As shown in FIGS. 5 and 6, the blades may overlap the same horizontal space so that, for instance in FIG. 5, the first blade 18 passes above the second blade 20. In such embodiment, one of the blade shafts is longer than the other to effect the respective blade positions. Similarly, as shown in FIG. 6, the first, second, and third blades 18, 20, 21 may overlap portions of the same horizontal space but at different heights. In such an embodiment, the blade shafts 40, 42, 43 may vary in length to affect the respective blade 18, 20, 21 position.

The first, second and third blades 18, 20, 21 also may vary in size. For instance, the first blade 18 may be substantially larger than the second blade 20. The blades 18, 20, 21 also may vary in shape so that multiple cut types can be made to the food in the container or so that, for instance, the first blade 18 will force the food toward the second blade 20 for improved cutting and blending.

In another embodiment, speed reduction gears (not shown) may be implemented in the gear system of the blender. The speed reduction gears may be used to control the rotational speed of the blades. The first, second and third blades 18, 20, 21 may be controlled at the same speed through the speed reduction gears. The speed reduction gears also may be configured to individually alter the speed of the first, second and third blades 18, 20, 21 separately. For instance, each blade assembly may be controlled by a separate speed reduction gear system to allow for variable blade speed per blade while using only one electric motor.

The multiple blade blender also may be used to enhance the viewing pleasure of watching a blender chop, mix, and blend a plurality of foods or materials. The blades may be positioned at any angles or heights that promote the visual effect of blending. For instance, the blades may be positioned to create a whirlpool effect while blending, create a centrifugal effect while blending, or create a quick uniform blend of the plurality of foods or materials. Blade shapes and sizes also may be chosen to give a desired visual effect while blending.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A blender system, comprising:
   a blender base;
   a container removably engaged with the blender base, the blender base comprising a drive shaft, a gear system, a first blade assembly and a second blade assembly;
   the first blade assembly comprising a first blade affixed to an end of a first blade shaft;
   the second blade assembly comprising a second blade affixed to an end of a second blade shaft;
   wherein the drive shaft engages the gear system and wherein the gear system engages the first blade shaft of the first blade assembly and the second blade shaft of the second blade assembly such that movement of the drive shaft is operable to cause the first blade and the second blade to rotate;
   wherein the drive shaft extends substantially vertically and the first blade shaft and the second blade shaft are substantially angled from the vertical position.

2. The blender system of claim 1 wherein the first blade and the second blade are positioned at different heights.

3. The blender system of claim 1 wherein the first blade is angled about 30 degrees from the vertical position in a direction toward the container.

4. The blender system of claim 3 wherein the second blade is angled about 30 degrees from the vertical position in a direction toward the container.

5. The blender system of claim 1 further comprising a third blade assembly in the blender base, the third blade assembly having a third blade shaft and a third blade.

6. A blender system, comprising:
   a blender base;
   a container removably engaged with the blender base;
   a first blade assembly and a second blade assembly provided in the blender base, the first blade assembly comprising a first blade affixed to an end of a first blade shaft, the second blade assembly comprising a second blade affixed to an end of a second blade shaft; and
   a motor operatively connected to at least one of the first and second blade assemblies;
   wherein the drive shaft extends substantially vertically and the first blade shaft and the second blade shaft are substantially angled from the vertical position.

7. The blender system of claim 6 wherein the first blade is angled about 30 degrees from the vertical position in a direction toward the container.

8. The blender system of claim 7 wherein the second blade is angled about 30 degrees from the vertical position in a direction toward the container.

9. The blender system of claim 7 further comprising a third blade assembly in the blender base, the third blade assembly having a third blade shaft and a third blade.

10. The blender system of claim 7 wherein the container has a substantially circular cross-section.

11. A blender system, comprising:
    a blender base;
    a container removably engaged with the blender base;
    a first blade assembly, a second blade assembly and a third blade assembly provided in the blender base, the first blade assembly comprising a first blade affixed to an end of a first blade shaft, the second blade assembly comprising a second blade affixed to an end of a second blade shaft, and the third blade assembly comprising a third blade affixed to an end of a third blade shaft; and
    a motor operatively connected to at least one of the first, second and third blade assemblies;
    wherein the drive shaft extends substantially vertically and the first, second and third blade assemblies are positioned in a triangular configuration about the center of the base and are substantially angled from the vertical position.

12. The blender system of claim 11 wherein the first blade shaft, the second blade shaft, and the third blade shaft are each angled about 30 degrees from the vertical position toward the container.

13. The blender system of claim 11 wherein the container has a substantially circular cross-section.

* * * * *